United States Patent
Monajemi et al.

(10) Patent No.: US 11,864,010 B2
(45) Date of Patent: Jan. 2, 2024

(54) AUTOMATED ACTIVATION OF UNSOLICITED PROBE RESPONSES

(71) Applicant: Cisco Technology, Inc., San Jose, CA (US)

(72) Inventors: Pooya Monajemi, Irvine, CA (US); Vishal Satyendra Desai, San Jose, CA (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 17/366,363

(22) Filed: Jul. 2, 2021

(65) Prior Publication Data

US 2023/0007516 A1 Jan. 5, 2023

(51) Int. Cl.
*H04W 24/08* (2009.01)
*H04L 43/12* (2022.01)

(52) U.S. Cl.
CPC ............. *H04W 24/08* (2013.01); *H04L 43/12* (2013.01)

(58) Field of Classification Search
CPC .............................. H04W 24/08; H04L 43/12
See application file for complete search history.

(56) References Cited

U.S. PATENT DOCUMENTS

| | | | |
|---|---|---|---|
| 9,936,443 B2 * | 4/2018 | Kneckt | H04W 48/16 |
| 11,102,715 B2 * | 8/2021 | Gan | H04B 17/364 |
| 2003/0181211 A1 * | 9/2003 | Razavilar | H04W 36/06 |
| | | | 455/450 |
| 2015/0156709 A1 | 6/2015 | Skukla et al. | |
| 2019/0297525 A1 * | 9/2019 | Keragodu Surya Prakash | |
| | | | H04W 28/0236 |
| 2020/0068486 A1 | 2/2020 | Asterjadhi et al. | |
| 2020/0112910 A1 | 4/2020 | Cherian et al. | |
| 2020/0137651 A1 | 4/2020 | Cariou et al. | |
| 2020/0389869 A1 * | 12/2020 | Patil | H04W 72/005 |
| 2020/0392571 A1 * | 12/2020 | Koehler | G16B 25/10 |
| 2022/0417837 A1 * | 12/2022 | Sirisilla | H04L 5/0041 |
| 2023/0209632 A1 * | 6/2023 | Inohiza | H04L 5/0053 |
| | | | 370/328 |

FOREIGN PATENT DOCUMENTS

WO 2018232138 A1 12/2018

* cited by examiner

*Primary Examiner* — Hassan Kizou
*Assistant Examiner* — Hector Reyes
(74) *Attorney, Agent, or Firm* — Merchant & Gould P.C.

(57) ABSTRACT

Automated activation of unsolicited probe responses may be provided. Probe traffic data may be received. Then, based on the probe traffic data, a plurality of probe traffic cost metrics may be determined. Each one of the plurality of probe traffic cost metrics may be respectively associated with a plurality of Unsolicited Probe Response (UPR) modes. An Access Point (AP) may then be operated in a one of the plurality of UPR modes that has a respective probe traffic cost metric that indicates a lowest probe traffic cost of the plurality of probe traffic cost metrics.

20 Claims, 4 Drawing Sheets

AUTOMATED ACTIVATION OF UNSOLICITED PROBE RESPONSES

TECHNICAL FIELD

The present disclosure relates generally to automated activation of unsolicited probe responses.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
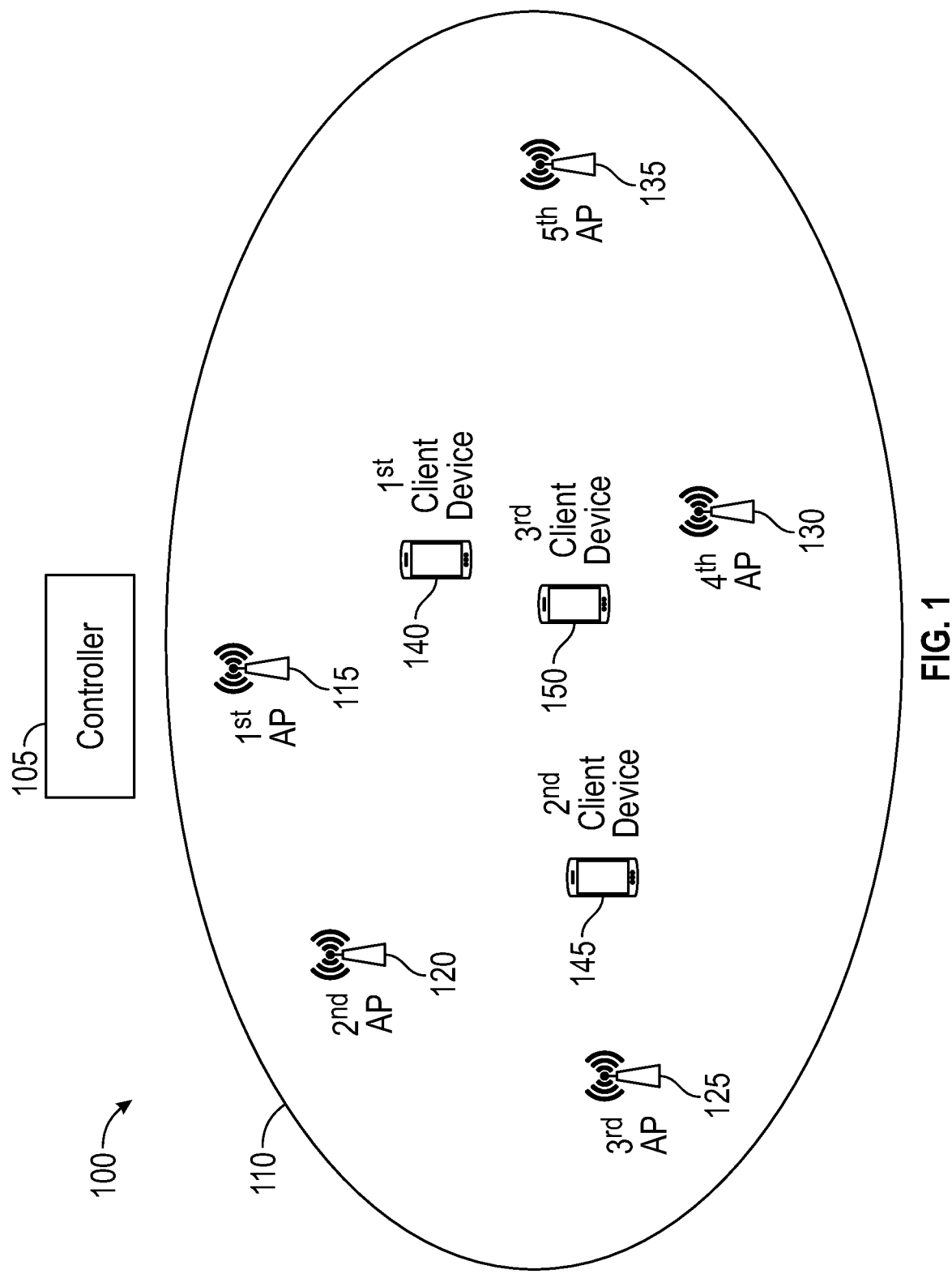
FIG. 1 is a block diagram of an operating environment for providing automated activation of unsolicited probe responses.

Automated activation of unsolicited probe responses may be provided. Probe traffic data may be received. Then, based on the probe traffic data, a plurality of probe traffic cost metrics may be determined. Each one of the plurality of probe traffic cost metrics may be respectively associated with a plurality of Unsolicited Probe Response (UPR) modes. An Access Point (AP) may then be operated in a one of the plurality of UPR modes that has a respective probe traffic cost metric that indicates a lowest probe traffic cost of the plurality of probe traffic cost metrics.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A collection of features was developed in the Institute of Electrical and Electronics Engineers (IEEE) 802.11ax specification targeted specifically for the 6 GHz Wi-Fi band. Among these features is the optional transmission of complete, unsolicited, broadcast probe responses every 20 Time Units (TUs) or less by a 6 GHz Access Point (AP). This feature may eliminate the need by client devices to probe APs in order to find out the operating parameters of Basic Service Sets (BSSs). By residing on an APs primary channel for, for example, 20TUs, a client device may be expected to receive a probe response and thus may not be required to send a probe request.

While this process may be effective in reducing air time used by client device probe requests, a probe response carrying complete information about an AP (e.g., including all its Virtual APs (VAPs)) may take a significant amount of time. Consequently, there may be a trade-off made network-wide if the aforementioned feature is to be switched on or off. Additionally, the implementer the aforementioned feature may be left with several possible probe response modes, some of which may contradict one another, with no tool to choose the most effective mode. Embodiments of the disclosure may provide processes, for example, for an automated selection of a most efficient unsolicited probe response mode, based on client device and cell conditions.

Due to the existence of a large number of channels in the 6 GHz band, the IEEE 802.11ax specification may have provided processes for client devices to discover a 6 GHz AP by only scanning in the 2.4 GHz and 5 GHz bands. Accordingly, any AP that carries both 6 GHz and 2.4/5 GHz radios may advertise the existence of the 6 GHz AP in alternate bands (i.e., 2.4/5 GHz). Once a client device receives information about the existence of a Basic Service Set Identifier (BSSID) in 6 GHz, the client device may then probe the BSSID in 6 GHz to receive the complete BSS operation information.

The reporting of co-located 6 GHz radios by 2.4/5 radios may reduce the wildcard broadcast probing in 6 GHz in search of nearby APs, and may help maintain cleaner and better-managed channels. 6 GHz probing may not disappear completely. For example, a client device that has discovered an AP, but may need to receive complete BSS operation information may still probe the 6 GHz AP directly. In order to address this unicast probing behavior, the IEEE 802.11ax specification may offer the option for an AP operating in 6 GHz to send broadcast Unsolicited Probe Responses (UPRs) at, for example, 20 Time Unit (TU) intervals. For example, a TU may be equal to 1,024 microseconds. With this scheme, a client device may wait on channel for 20 TUs and receive the desired probe response automatically without having sent a request. When the 20 TU transmission of UPR is enabled on all APs operating in a channel in a vicinity, then the co-located 2.4/5 GHz APs may signal the activation of the UPR transmission in their neighbor reports. As a result, a client device that receives information about the 6 GHz BSSIDs may know not to send probe requests when scanning the 6 GHz channels that have UPR activated on all APs. A transmitting AP may send the UPRs individually in Physical Layer Protocol Data Units (PPDUs), or it may combine to send them in High Efficiency (HE) Down Link (DL) Multi-User (MU) frames by assigning them to a broadcast Resource Unit (RU).

The UPR mode may be useful, but may also waste airtime when activated in a network with few entering client devices. In a deployment where efficiency is primary, the UPR mode may defeat its own purpose. When sending a probe request on a channel as part of a scanning operation, a client device may be expected to set a "minimum channel time" field. This field may indicate how long a client device may remain on a channel where it sent the probe request before potentially jumping to scan another channel. While the IEEE 802.11ax specification may provide no limits for minimum channel time, typical values used by vendors may range between 5 TUs to 20 TUs. The minimum channel time field may inform the AP of the amount of time it has to send a probe response, or to potentially satisfy the request with the next scheduled beacon.

FIG. 1 shows an operating environment 100 for providing automated activation of unsolicited probe responses. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices). The plurality of APs may comprise a first AP 115, a second AP 120, a third AP 125, a fourth AP 130, and a fifth AP 135. The plurality of APs may provide wireless network access to a plurality of client devices as they move within coverage environment 110. The plurality of client devices, may comprise, but are not limited to, a first client device 140, a second client device 145, and a third client device 150. Ones of the plurality of client devices may comprise, but is not limited to, a smart phone, a personal computer, a tablet device, a mobile device, a telephone, a remote control device, a set-top box, a digital video recorder, an Internet-of-Things (IoT) device, a network computer, a router, or other similar microcomputer-based device.

Each of the plurality of APs may be compatible with specification standards such as, but not limited to, the IEEE 802.11ax specification standard for example. In addition, each of the plurality of APs may include a co-located 6 GHz radio with 2.4/5 radios or may comprise only a 6 GHz radio. As such, the 6 GHz radios may be complaint with the IEEE 802.11ax specification and may offer the option for sending broadcast UPRs.

Controller 105 may comprise a Wireless Local Area Network controller (WLC) and may provision and control coverage environment 110 (e.g., a WLAN). Controller 105 may allow first client device 140, second client device 145, and third client device 150 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide automated activation of unsolicited probe responses.

The elements described above of operating environment 100 (e.g., controller 105, first AP 115, second AP 120, third AP 125, fourth AP 130, fifth AP 135, first client device 140, second client device 145, or third client device 150) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
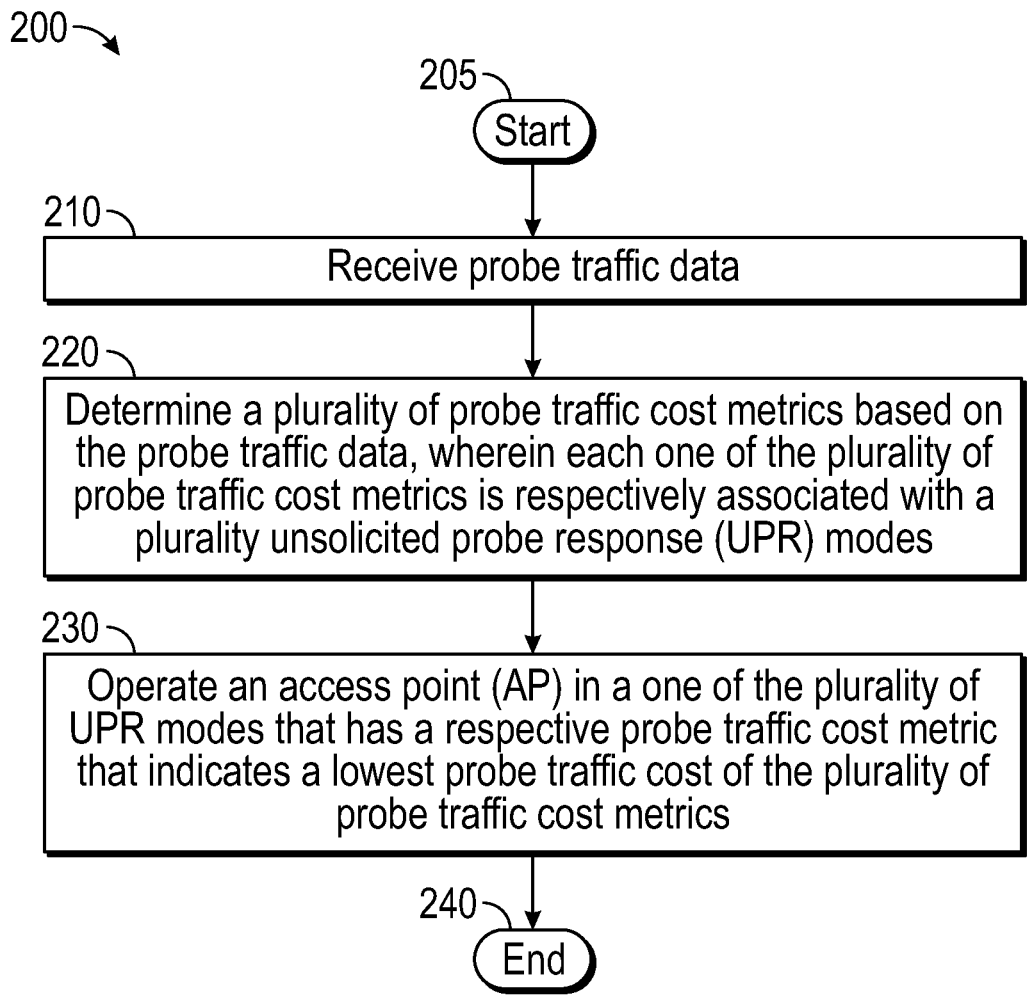
FIG. 2 is a flow chart of a method for providing automated activation of unsolicited probe responses.

FIG. 2 is a flow chart setting forth the general stages involved in a method 200 consistent with embodiments of the disclosure for providing automated activation of unsolicited probe responses. Method 200 may be implemented using controller 105 or any one of the plurality of APs as described in more detail above with respect to FIG. 1. Ways to implement the stages of method 200 will be described in greater detail below.

Method 200 may begin at starting block 205 and proceed to stage 210 where controller 105 may receive probe traffic data. For example, in each 6 GHz Basic Service Set (BSS), the following criteria (i.e., probe traffic data) may be measured or estimated: i) probe request air time (e.g., both intra-BSS and inter-BSS); ii) probe response air time (e.g., both intra-BSS and inter-BSS); and iii) Down Link (DL) Multi-User (MU) Orthogonal Frequency-Division Multiple Access (OFDMA) frame transmission rate. Other probe traffic data may be used and embodiments of the disclosure are not limited to the aforementioned probe traffic data.

From stage 210, where controller 105 receives the probe traffic data, method 200 may advance to stage 220 where controller 105 may determine a plurality of probe traffic cost metrics based on the probe traffic data. Each one of the plurality of probe traffic cost metrics may be respectively associated with a plurality of Unsolicited Probe Response (UPR) modes. For example, embodiments of the disclosure may dynamically select a best of three possible UPR modes of UPR transmission in an infra WLAN deployment. The UPR mode may change dynamically as cell (e.g., coverage environment 110) conditions change. While three UPR modes may be illustrated, embodiments of the disclosure are not limited to the illustrated three modes and may comprise any number of modes. Notwithstanding, three UPR modes of operation may comprise: UPR disabled, limited UPR, and full UPR as discussed in more detail below.

With UPR disabled, no UPRs may be transmitted. If the AP (e.g. first AP 115) is 6 GHz only, Fast Initial Link Setup (FILS) discovery frames may be transmitted, but for complete Basic Service Set (BSS) information, client devices may have to probe. Limited UPR may comprise UPR without signaling. For example, one or more APs may choose to send UPRs temporarily in order to address a burst of probe traffic. Because not all on-channel APs regularly send UPRs, this activation may not be signaled by co-located 2.4/5 GHz APs. Client devices may still send probe requests, but their responses may be aggregated to the extent that their minimum channel times allow. The frequency of UPR transmission may be configurable to allow for more aggregation. With full UPR, this mode may be signaled. All APs in a locality operating on a channel activate UPRs and may regularly transit them. The activation of UPRs may be signaled by out-of-band APs.

Probe traffic cost metrics based on the probe traffic data may then be computed for each UPR mode of operation as per-BSS air time. With the UPR disabled mode, for example, the probe traffic cost metric may comprise the sum of probe request times and response times (e.g., inter and intra) over all co-channel BSS's in a locality (e.g., coverage environment 110). In limited UPR mode, for example, the probe traffic cost metric may comprise the sum of probe request and response times, counting one response for all requests whose min channel time meets the next UPR transmission at configured interval. In full UPR mode, for example, the probe traffic cost metric may comprise the probe response time per a predetermined number of TUs (e.g., 20 TUs) counted once for each transmitting AP. With respect to the limited UPR mode and the full UPR mode, because UPRs may be sent in broadcast RUs of DL MU frames, the air time considered may be reduced when the DL MU OFDMA frame transmission rate is high enough such that UPRs may be expected to be aggregated. With aggregation, an estimation made be made of how much the DL MU bundling of the UPR has added to channel air time of the DL MU frame for example.

Once controller 105 determines the plurality of probe traffic cost metrics based on the probe traffic data in stage 220, method 200 may continue to stage 230 where controller 105 may operate an AP (e.g., first AP 115) in a one of the plurality of UPR modes that has a respective probe traffic cost metric that indicates a lowest probe traffic cost of the plurality of probe traffic cost metrics. For example, the plurality of APs as illustrated in FIG. 1 may start operating in UPR disabled mode while performing the probe traffic measurements. When probe traffic passes a minimum threshold, the probe traffic cost metric determinations (e.g., calculations) as described above may be performed. For limited UPR mode, the probe traffic cost metric may be calculated for a number of candidate intervals in a limited range, such as 5 TUs to 20 TUs for example. When probe traffic is limited, the probe traffic cost metrics may point to continuing in the UPR disabled mode. When probe traffic is higher, but isolated and with a high response-to-request ratio, the probe traffic cost metrics may point to the limited UPR mode. When probe traffic is higher and not isolated, or with a high request-to-response ratio, the probe traffic cost metrics may point to the full UPR mode.

Consistent with embodiments of the disclosure, when deciding between limited UPR mode and full UPR mode, bursty probe traffic may be addressed separately from a consistently high probing scenario (e.g., attendees entering a conference room versus an airport gate area). As such, embodiments of the disclosure may switch to the full UPR mode if probe traffic cost metrics point to this option for more than a predetermined number of consecutive measurement intervals. With the full UPR mode, the probe traffic that would have been present in absence of UPRs may not be predicted. Accordingly, embodiments of the disclosure may revert to the limited UPR mode after a period of time to re-evaluate the probe traffic cost metrics.

Predictive activation may be used with embodiments of the disclosure. For example, predictive activation of the limited UPR mode or full UPR mode may be performed based on multiple factors. One factor may comprise a burst of probe traffic in one or more co-located radios in alternate bands from clients that are 6 GHz capable. Other factors may comprise a burst of probe traffic in an adjacent set of APs (e.g., passengers exiting a train) hard-coded timing based on prior knowledge (e.g., match end time in a stadium, train or subway schedules, configured or learned, for example, one wave each 90 minutes between 6:00 AM and 8:30 AM). Yet other factors may comprise a percentage increase in new 6 GHz capable stations being monitored by a central entity (i.e., such as master AP in coverage environment 110 or controller 105). For example, if the central entity detects the presence of a significant increase in new registered users, it may propagate UPR enablement on the collocated access points.

Figure 3:
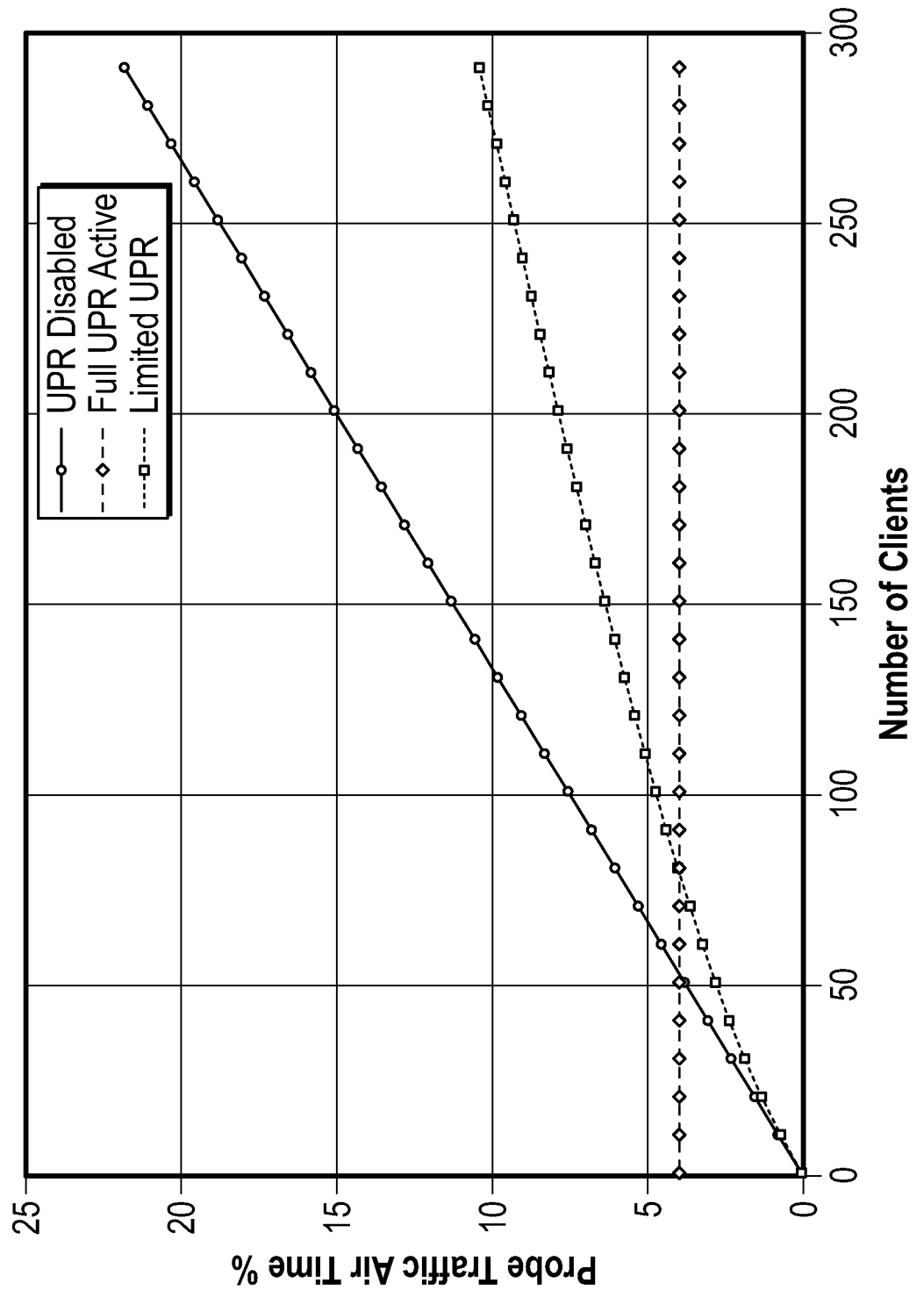
FIG. 3 is a graph illustrating an example use case showing probe traffic air time as a percentage of air time for each Unsolicited Probe Response (UPR) mode.

FIG. 3 illustrates an example use case that may be consistent with embodiments of the disclosure showing probe traffic air time as a percentage of air time for each of the aforementioned UPR modes. The gains from this scheme may vary depending on scenarios, device implementation, and deployment factors. FIG. 3 shows a computation of airtime consumption for each UPR modes from a sample density scenario (e.g., airport gate area, stadium walkways, etc.) and based on device probing behaviors observed in some commonly available consumer devices:

Number of channels: 20
Scan dwell per channel: 20 msec
Probe requests per scan dwell: 2
Scan cycles: 5
Scan interval: 20 seconds
Probe request duration (~6 mbps): 200 microsec
Probe response duration (~6 mbps): 400 microsec
Number of VAPs per radio: 2
Probe Request Channel Wait Time: 10 msec Air time consumption may grow linearly with the number of clients in UPR disabled mode, while in full UPR mode, a constant amount of air time may be consumed. In limited UPR mode, the number of probe requests shows the same linear trend, while the number of responses may asymptotically approache a constant due to the ability to limit the number of responses. The results in FIG. 3 are shown for one BSS. When multiple co-channel neighboring BSS's are in the vicinity, then air times from all these BSS's may be accumulated. Once controller 105 operates the AP (e.g., first AP 115) in the one of the plurality of UPR modes that has a respective probe traffic cost metric that indicates the lowest probe traffic cost of the plurality of probe traffic cost metrics in stage 230, method 200 may then end at stage 240.

Figure 4:
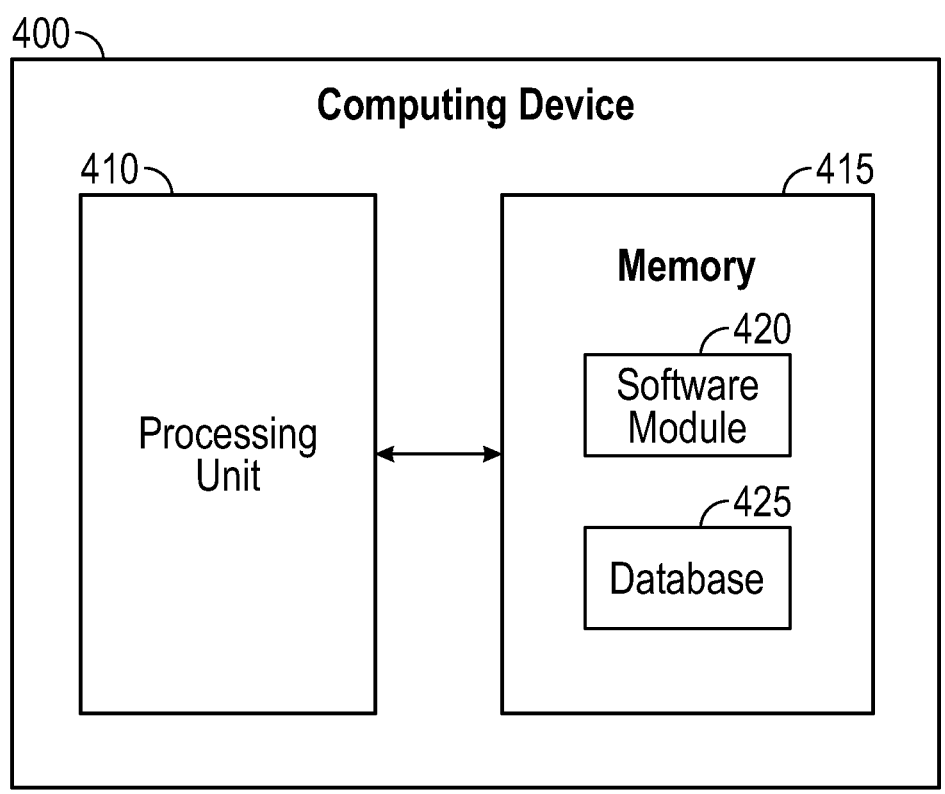
FIG. 4 is a block diagram of a computing device.

FIG. 4 shows a computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing automated activation of unsolicited probe responses as described above with respect to FIG. 2. Computing device 400, for example, may provide an operating environment for controller 105, first AP 115, second AP 120, third AP 125, fourth AP 130, fifth AP 135, first client device 140, second client device 145, or third client device 150. Controller 105, first AP 115, second AP 120, third AP 125, fourth AP 130, fifth AP 135, first client device 140, second client device 145, or third client device 150 may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a controller, probe traffic data;
   determining, by the controller, a plurality of probe traffic cost metrics based on the probe traffic data, wherein each one of the plurality of probe traffic cost metrics respectively indicates a probe traffic cost respectively corresponding to each of a plurality of Unsolicited Probe Response (UPR) modes; and
   causing, by the controller, an Access Point (AP) to operate in a one of the plurality of UPR modes that has a respective probe traffic cost metric that indicates a lowest probe traffic cost of the plurality of probe traffic cost metrics.

2. The method of claim 1, wherein the probe traffic data comprises probe request air time and probe response air time.

3. The method of claim 2, wherein the probe traffic data further comprises a Down Link (DL) Multi-User (MU) Orthogonal Frequency-Division Multiple Access (OFDMA) frame transmission rate.

4. The method of claim 1, wherein the plurality of UPR modes comprise a UPR disabled mode, a Limited UPR mode, and a full UPR mode.

5. The method of claim 4, wherein determining a one of the plurality of probe traffic cost metrics associated with the Limited UPR mode comprises adding of probe request air time and probe response air time over all co-channel Basic Service Sets (BSSs).

6. The method of claim 4, wherein determining a one of the plurality of probe traffic cost metrics associated with the UPR disabled mode comprises adding of probe request air time and probe response air time, counting one response for all requests whose minimum channel time meets a next UPR transmission at a configured interval.

7. The method of claim 4, wherein determining a one of the plurality of probe traffic cost metrics associated with the full UPR mode comprises determining the one of the plurality of probe traffic cost metrics associated with the full UPR mode to be a probe response air time per a predetermined number of Time Units (TUs).

8. The method of claim 7, wherein the predetermined number of TUs is 20.

9. The method of claim 1, further comprising repeating the method periodically.

10. A system comprising:
a memory storage; and
a processing unit disposed in a controller, the processing unit coupled to the memory storage, wherein the processing unit is operative to:
receive probe traffic data;
determine a plurality of probe traffic cost metrics based on the probe traffic data, wherein each one of the plurality of probe traffic cost metrics is respectively indicates a probe traffic cost respectively corresponding to each of a plurality of Unsolicited Probe Response (UPR) modes; and
cause an Access Point (AP) to operate in a one of the plurality of UPR modes that has a respective probe traffic cost metric that indicates a lowest probe traffic cost of the plurality of probe traffic cost metrics.

11. The system of claim 10, wherein the plurality of UPR modes comprise a UPR disabled mode, a Limited UPR mode, and a full UPR mode.

12. The system of claim 11, wherein the processing unit being operative to determine a one of plurality of probe traffic cost metrics associated with the Limited UPR mode comprises the processing unit being operative to add probe request air time and probe response air time over all co-channel Basic Service Sets (BSSs).

13. The system of claim 11, wherein the processing unit being operative to determine a one of the plurality of probe traffic cost metrics associated with the UPR disabled mode comprises the processing unit being operative to add probe request air time and probe response air time, counting one response for all requests whose minimum channel time meets a next UPR transmission at a configured interval.

14. The system of claim 11, wherein a one of the plurality of probe traffic cost metrics associated with the full UPR mode comprises a probe response air time per a predetermined number of Time Units (TUs).

15. A non-transitory computer-readable medium that stores a set of instructions which when executed perform a method executed by the set of instructions comprising:
receiving, by a controller, probe traffic data;
determining, by the controller, a plurality of probe traffic cost metrics based on the probe traffic data, wherein each one of the plurality of probe traffic cost metrics respectively indicates a probe traffic cost respectively corresponding to each of a plurality of Unsolicited Probe Response (UPR) modes; and
causing, by the controller, an Access Point (AP) to operate in a one of the plurality of UPR modes that has a respective probe traffic cost metric that indicates a lowest probe traffic cost of the plurality of probe traffic cost metrics.

16. The non-transitory computer-readable medium of claim 15, wherein the probe traffic data comprises probe request air time, probe response air time, and a Down Link (DL) Multi-User (MU) Orthogonal Frequency-Division Multiple Access (OFDMA) frame transmission rate.

17. The non-transitory computer-readable medium of claim 15, wherein the plurality of UPR modes comprise a UPR disabled mode, a Limited UPR mode, and a full UPR mode.

18. The non-transitory computer-readable medium of claim 17, wherein determining a one of the plurality of probe traffic cost metrics associated with the Limited UPR mode comprises adding of probe request air time and probe response air time over all co-channel Basic Service Sets (BSSs).

19. The non-transitory computer-readable medium of claim 17, wherein determining a one of the plurality of probe traffic cost metrics associated with the UPR disabled mode comprises adding of probe request air time and probe response air time, counting one response for all requests whose minimum channel time meets a next UPR transmission at a configured interval.

20. The non-transitory computer-readable medium of claim 17, wherein determining a one of the plurality of probe traffic cost metrics associated with the full UPR mode comprises determining the one of the plurality of probe traffic cost metrics associated with the full UPR mode to be a probe response air time per a predetermined number of Time Units (TUs).

* * * * *